(12) United States Patent
Nagata

(10) Patent No.: US 9,191,846 B2
(45) Date of Patent: Nov. 17, 2015

(54) MONITORING METHOD OF MULTI-HOP WIRELESS NETWORK

(71) Applicant: FUJITSU LIMITED, Kawasaki-shi, Kanagawa (JP)

(72) Inventor: Nami Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/187,435

(22) Filed: Feb. 24, 2014

(65) Prior Publication Data

US 2014/0169178 A1 Jun. 19, 2014

Related U.S. Application Data

(63) Continuation of application No. PCT/JP2011/071404, filed on Sep. 20, 2011.

(51) Int. Cl.
| | | |
|---|---|---|
| *H04W 24/08* | (2009.01) | |
| *H04W 28/02* | (2009.01) | |
| *H04L 12/721* | (2013.01) | |
| *H04W 84/18* | (2009.01) | |
| *H04W 40/12* | (2009.01) | |

(52) U.S. Cl.
CPC .......... *H04W 24/08* (2013.01); *H04W 28/0284* (2013.01); *H04L 45/123* (2013.01); *H04W 40/12* (2013.01); *H04W 84/18* (2013.01)

(58) Field of Classification Search
None
See application file for complete search history.

(56) References Cited

U.S. PATENT DOCUMENTS

| 6,760,317 B1 * | 7/2004 | Honkanen et al. ............. 370/329 |
| 2005/0135379 A1 * | 6/2005 | Callaway et al. ........ 370/395.31 |
| 2010/0097924 A1 | 4/2010 | Yamaguchi et al. |
| 2011/0128918 A1 * | 6/2011 | Zhai .............................. 370/328 |
| 2011/0176487 A1 * | 7/2011 | Zhai .............................. 370/328 |

FOREIGN PATENT DOCUMENTS

| JP | 2003-298582 A | 10/2003 |
| JP | 2005-223497 A | 8/2005 |
| JP | 2005-347879 A | 12/2005 |
| JP | 2006-222650 A | 8/2006 |
| JP | 2009-225172 A | 10/2009 |
| WO | WO 2009/075097 A1 | 6/2009 |

OTHER PUBLICATIONS

International Search Report, mailed in connection with PCT/JP2011/071404 and mailed Nov. 15, 2011.
Notification of Transmittal of Translation of the International Preliminary Report on Patentability (Form PCT/IB/338, Form PCT/IB/373 & Form PCT/ISA/237), PCT/JP2011/071404, 6 pages, dated Apr. 3, 2014.

* cited by examiner

*Primary Examiner* — Khoa Huynh
(74) *Attorney, Agent, or Firm* — Fujitsu Patent Center

(57) ABSTRACT

A multi-hop wireless network monitor method for monitoring a state of a multi-hop wireless network including a plurality of nodes, the method includes: transmitting a packet that stores monitor data indicating a state or performance of a first node and identification information that identifies the first node; rewriting the monitor data stored in the packet with the monitor data detected by a second node and rewriting the identification information stored in the packet with the identification information that identifies the second node in the second node when the monitor data detected by the second node is worse than the monitor data stored in the packet; and specifying a node in the worst state or performance in a propagation route of the packet according to the identification information stored in the packet.

10 Claims, 14 Drawing Sheets

| GLOBAL DESTINATION (GD) | GLOBAL SOURCE (GS) | LOCAL DESTINATION (LD) | LOCAL SOURCE (LS) | . . . | MONITOR DATA FLAG | . . . | WORST NODE ID | WORST NODE DATA | . . . |

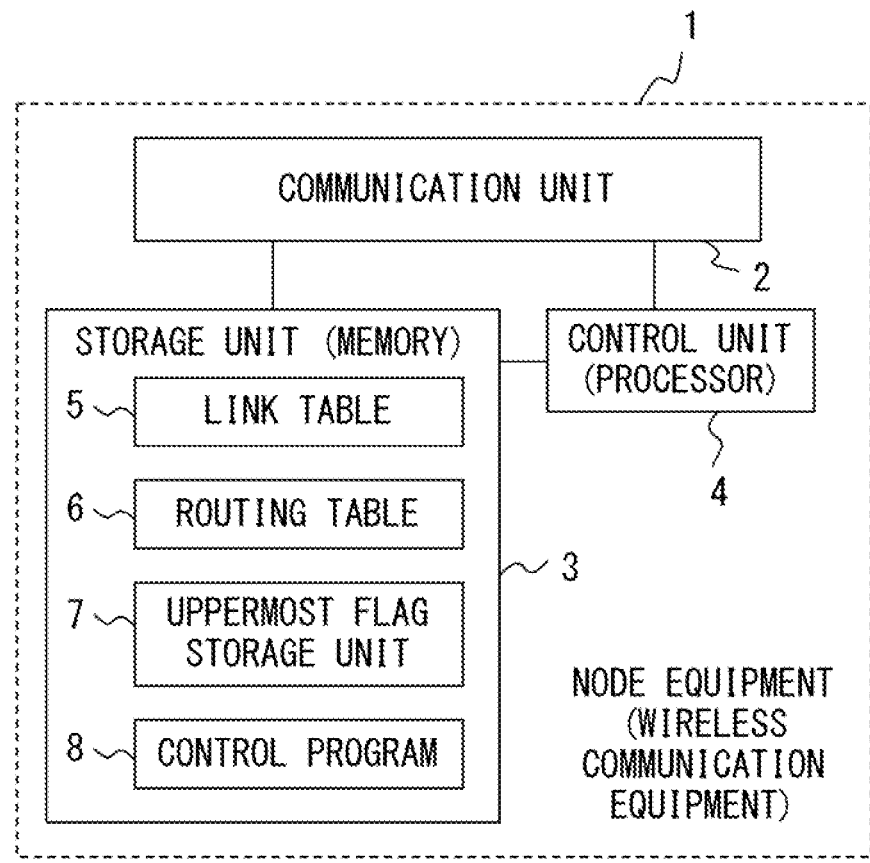
F I G. 2

| ADJACENT NODE | OUTGOING LINK EVALUATION VALUE | INCOMING LINK EVALUATION VALUE | LINK WEIGHT |
|---|---|---|---|
| Z | 11 | 9 | 10 |
| X | 9 | 9 | 9 |
| Y | 6 | 6 | 6 |

FIG. 4

| GLOBAL DESTINATION (GD) | LOCAL DESTINATION (LD) | ROUTE WEIGHT | LINK WEIGHT | ROUTE EVALUATION VALUE |
|---|---|---|---|---|
| Z | Y | 16 | 5 | 21 |
| Z | X | 19 | 5 | 24 |
| ⋮ | | | | |

F I G. 5

| GLOBAL DESTINATION (GD) | GLOBAL SOURCE (GS) | LOCAL DESTINATION (LD) | LOCAL SOURCE (LS) | ... | MONITOR DATA FLAG | ... | WORST NODE ID | WORST NODE DATA |
|---|---|---|---|---|---|---|---|---|

F I G. 7

| LOCAL DESTINATION (LD) | LOCAL SOURCE (LS) | ... | MONITOR DATA FLAG | ... | WORST NODE ID | WORST NODE DATA | ... |
|---|---|---|---|---|---|---|---|

F I G. 1 3

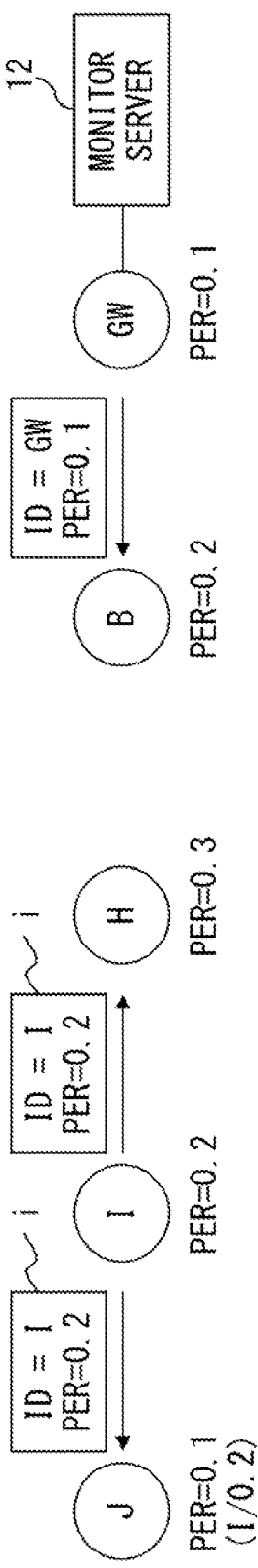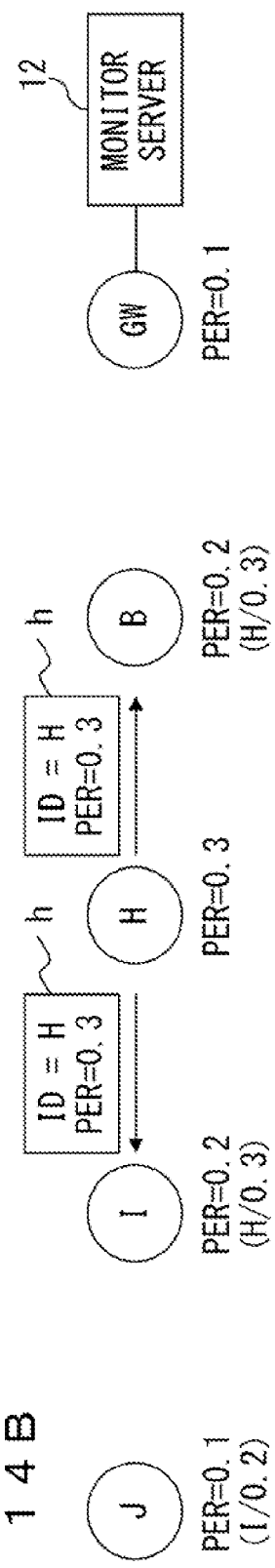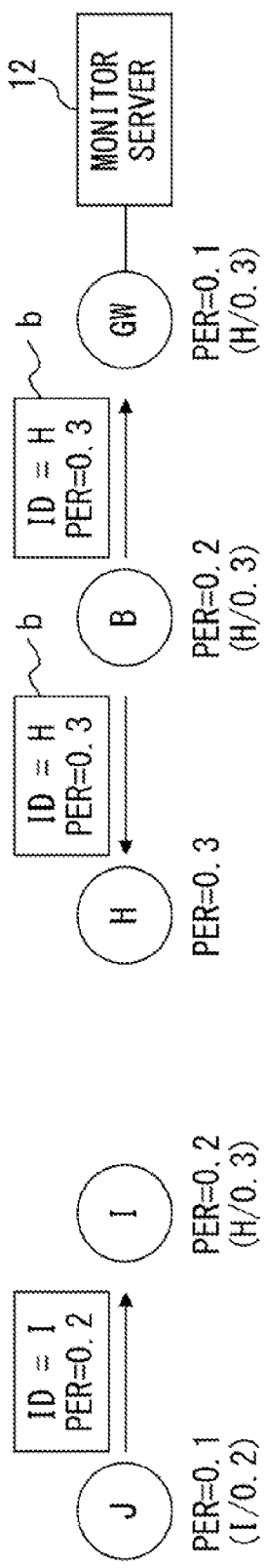

MONITORING METHOD OF MULTI-HOP WIRELESS NETWORK

CROSS-REFERENCE TO RELATED APPLICATION

This application is a continuation application of International Application PCT/JP2011/071404 filed on Sep. 20, 2011 and designated the U.S., the entire contents of which are incorporated herein by reference.

FIELD

The embodiments discussed herein are related to a method for monitoring the state of a multi-hop wireless network and a multi-hop wireless network system.

BACKGROUND

As an aspect of a network including a plurality of nodes, a multi-hop wireless network in which each node equipment is capable of autonomously performing communications has been put into practical use. In the network, each node equipment may autonomously select a route of a packet. That is, each node equipment functions as a router or a switch. Each node equipment may recognize the configuration of a surrounding network by communicating a message etc. with adjacent node equipment. Therefore, in this system, a desired network may be created only by implementing a node equipment in an environment in which the network is to be created without providing management equipment for managing the entire network. Also in this method, a node may be easily added or deleted, thereby flexibly changing the configuration of a network.

Proposed as the technology related to a multi-hop wireless network is a method for allowing each wireless sensor node to sequentially transfer a data packet to a wireless server node (for example, the Japanese Laid-open Patent Publication No. 2005-223497). Also proposed as another related technology is a multi-hop wireless network capable of easily performing monitoring and controlling processes with low power consumption (for example, the Japanese Laid-open Patent Publication No. 2006-222650). Proposed as a further related technology are an equipment and a method capable of efficiently performing flooding communications and performing stable communications (for example, the Japanese Laid-open Patent Publication No. 2009-225172).

In a multi-hop wireless network, when the state or the performance of a node is degraded, there is the possibility that the performance is degraded in a large area in the network. For example, when there occurs the congestion in a certain node, the efficiency of the data transmission becomes lower in the route which passes through the node, and a packet may be discarded depending on a condition. Therefore, it is preferable that a user or a network administrator may quickly detect a node in a poor state.

The method of monitoring the state of each node in a multi-hop wireless network is realized by, for example, the procedure of each node equipment which detects the state (congestion, reception power, etc.) of the local node and transmits the result of the detection to a server computer. In this case, the server computer may collect the state information from all nodes, perform statistical processing etc., and detect a node in a poor state. However, in this method, when the number of nodes is large, the computational complexity of the server computer is serious, and it is necessary to provide a large memory area to store data received from each node. Furthermore, in this method, the traffic for each node which notifies the server computer of the state becomes heavy.

To improve the problem above, for example, a threshold for judgment of the state is set in each node equipment, and only a node equipment whose state is lower than the threshold outputs an alarm message. However, it is difficult to determine a threshold in this method. That is, if the threshold is too high, there is the possibility that a node in a poor state is not detected. On the other hand, when the threshold is too low, an alarm message is output from a large number of nodes, and there is the possibility that a node which is practically and badly degraded is not specified. Therefore, to detect a node in a degraded state with high accuracy, it is preferable that a server computer collects the state information about a multi-hop wireless network.

SUMMARY

According to an aspect of the embodiments, a multi-hop wireless network monitor method monitors a state of a multi-hop wireless network including a plurality of nodes. The method includes: transmitting a packet that stores monitor data indicating a state or performance of a first node and identification information that identifies the first node; rewriting the monitor data stored in the packet with the monitor data detected by a second node and rewriting the identification information stored in the packet with the identification information that identifies the second node in the second node when the monitor data detected by the second node is worse than the monitor data stored in the packet; and specifying a node in the worst state or performance in a propagation route of the packet according to the identification information stored in the packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration of node equipment;

FIG. 4 illustrates an example of a link table;

FIG. 5 illustrates an example of a routing table;

FIG. 7 illustrates an example of a monitor packet;

FIG. 13 illustrates an example of a Hello packet; and

FIGS. 14A through 14C are explanatory views of the method of transmitting monitor data using a Hello packet.

DESCRIPTION OF EMBODIMENTS

The monitor method according to an embodiment of the present invention monitors the state of a multi-hop wireless network. Thus, described briefly below is a multi-hop wireless network monitored by the method according to the present embodiment.

Figure 1:
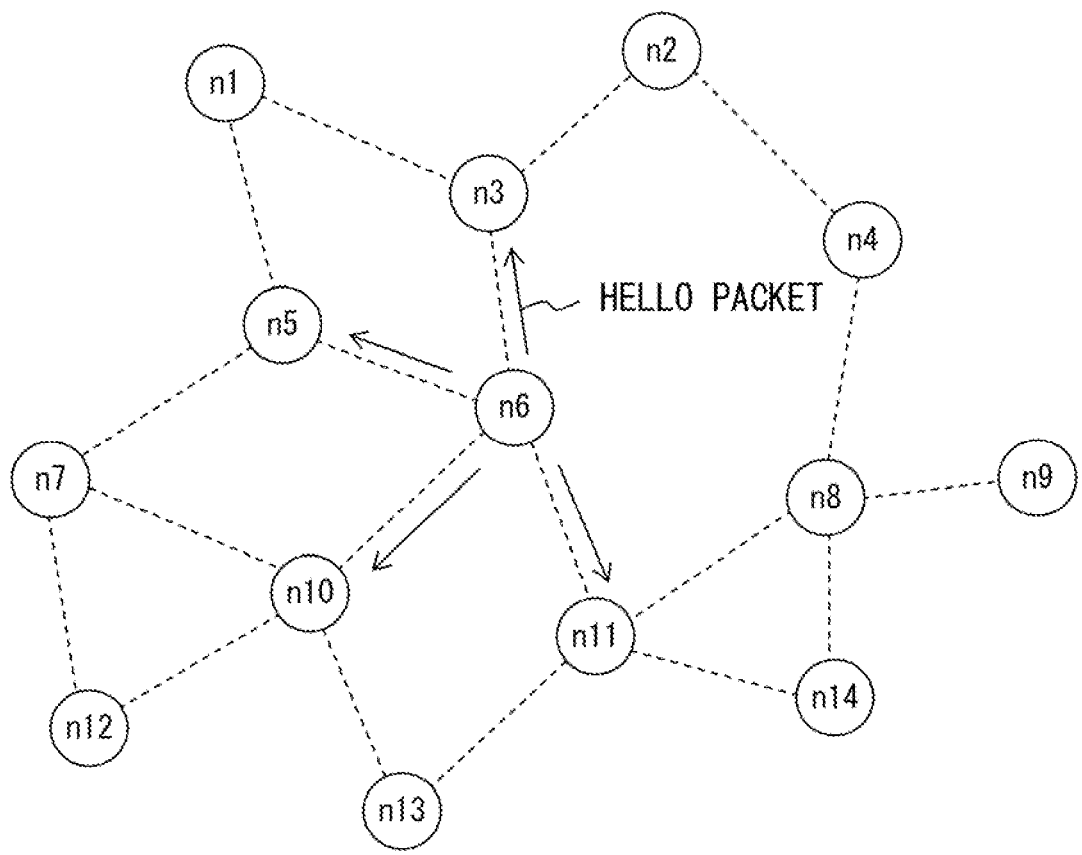
FIG. 1 is an explanatory view of a node and a link of a multi-hop wireless network.

FIG. 1 is an explanatory view of a node and a link of a multi-hop wireless network. The multi-hop wireless network includes a plurality of wireless communication equipments as illustrated in FIG. 1. In the explanation below, each wireless communication equipment may be referred to as node equipment or simply as a node. In the example in FIG. 1, the multi-hop wireless network includes nodes n1 through n14.

In FIG. 1, the broken line for connection between the nodes indicates a wireless link. For example, the node n6 has wireless links with the nodes n3, n5, n10 and n11. That is, the radio wave transmitted from the node n6 (that is, a radio signal) reaches the nodes n3, n5, n10 and n11, and the radio waves respectively transmitted from the nodes n3, n5, n10 and n11 reach the node n6. In the explanation below, it is assumed that a set of nodes connected to one another by the wireless link are adjacent to one another. That is, the nodes n3, n5, n10 and n11 are adjacent to the node n6. Namely, the nodes n3, n5, n10 and n11 are "adjacent nodes" of the node n6.

To establish a transfer route between nodes, each node equipment broadcasts a control packet such as a Hello packet, an RREQ (route request) packet, etc. periodically or as necessary.

A control packet such as a Hello packet, an RREQ packet, etc. is used also to report to another node that a node is present. For example, assuming that the node n6 broadcasts a Hello packet, and the node equipments n3, n5, n10 and n11 receive the Hello packet. In this case, each of the node equipments n3, n5, n10 and n11 recognizes the existence of the node n6 as an adjacent node.

A Hello packet is transmitted from each node as described above. Therefore, for example, when the node equipment n3 transmits a Hello packet, the node equipments n1, n2 and n6 respectively receive the Hello packet. In this case, each of the node equipments n1, n2 and n6 recognizes the existence of the node n3 as an adjacent node. Thus, each node equipment can recognize its adjacent node.

FIG. 2 illustrates a configuration of node equipment (that is, wireless communication equipment). Node equipment 1 includes a communication unit 2, a storage unit 3, and a control unit 4. The communication unit 2 includes an antenna, a transmitter, and a receiver, and provides a wireless interface. The storage unit 3 is, for example, semiconductor memory, and is used by the control unit 4. The storage unit 3 includes non-volatile memory. The control unit 4 includes a processor, and controls the operation of the node equipment 1. The communication unit 2, the storage unit 3, and the control unit 4 are connected to one another by, for example, a bus. Although not specially illustrated in the drawings, the node equipment 1 may include an input interface for connection of an identification device and/or an output interface for connection of an output device.

The node equipment 1 further includes a link table 5, a routing table 6, and an uppermost flag storage unit 7. The link table 5 and the routing table 6 are created in the storage unit 3. The uppermost flag storage unit 7 is realized using the storage unit 3. Furthermore, the storage unit 3 stores a control program 8 which describes the function of the node equipment 1.

The link table 5 stores link information. The link information indicates the quality of a link between the local node and an adjacent node. The link table 5 is updated depending on the contents of the Hello packet received by the node equipment from the adjacent node.

The routing table 6 stores route information. The route information indicates the destination adjacent node for forwarding a packet to a destination node. That is, the route information indicates the correspondence between the destination node of a packet and an adjacent node which relays the packet. The routing table 6 is updated depending on the contents of the Hello packet received by the node equipment from the adjacent node.

The uppermost flag storage unit 7 stores an uppermost flag. The uppermost flag indicates whether or not node equipment itself is located in the uppermost stream in the multi-hop wireless network with respect to the specified destination node.

Figure 3:
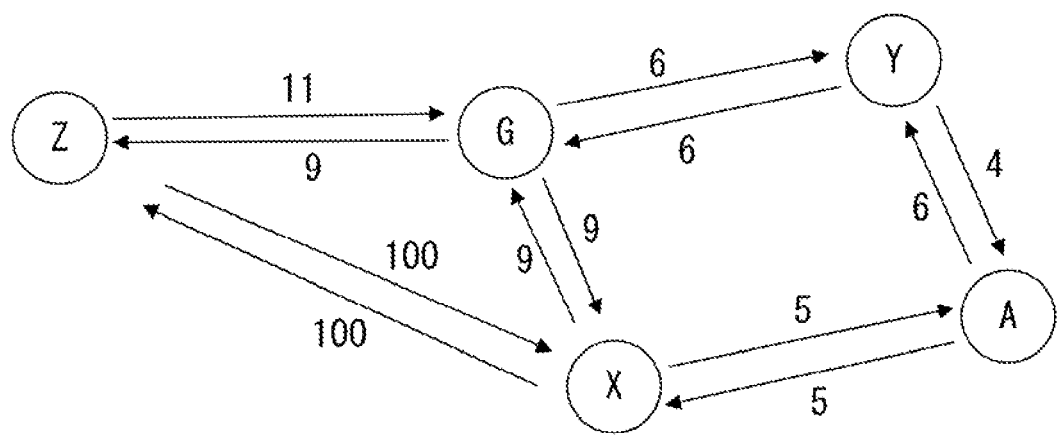
FIG. 3 is an explanatory view of the evaluation value of a link.

FIG. 3 explains the evaluation value of a link in a multi-hop wireless network. In FIG. 3, only a part of nodes (G, X, Y, Z, A) are illustrated in a number of nodes provided for the multi-hop wireless network.

The nodes G and X are respectively adjacent to the node Z. The nodes X, Y and Z are respectively adjacent to the node G. The nodes G, Z and A are respectively adjacent to the node X. The nodes G and A are respectively adjacent to the node Y. The nodes X and Y are respectively adjacent to the node A. The term "adjacent" refers to that stronger radio waves reach between the nodes than a specified level.

The link weight is an index indicting the quality of a wireless link between the nodes or the communication cost. In this embodiment, the link weight of a high quality link is small, and the link weight of a low quality link is large. The link weight between the nodes is calculated based on a pair of link evaluation values. For example, the evaluation value of a link from the node G to the node Z is "9", and the evaluation value of a link from the node Z to the node G is "11". The link weight between the nodes is expressed as the average of the pair of link evaluation values. Therefore, the link weight between the nodes G and Z is "10". Similarly, the link weight between the nodes X and Z is "100". That is, the case indicates that the quality of the link between the nodes G and Z is higher than the quality of the link between the nodes X and Z.

The quality of each link (that is, the evaluation value and the link weight) is detected in the following method. In this example, it is assumed that each node equipment repeatedly transmits a Hello packet in a specified period. In this case, if the link quality is high, the time interval in which the node equipment receives a Hello packet from an adjacent node is to be substantially constant. On the other hand, if the link quality is low, the variance of the time interval in which the node equipment receives a Hello packet from an adjacent node is large. Therefore, each node equipment may detect the link quality based on the reception interval of a Hello packet. For example, the node G illustrated in FIG. 3 may detect the quality of a link from the node Z to the node G by monitoring the time interval in which a Hello packet is received from the node Z.

Each node equipment may detect the link quality in other methods. For example, the node equipment may detect the link quality based on the reception level (for example, the intensity of received radio waves) of the Hello packet transmitted from the adjacent node.

FIG. 4 is an example of the link table 5. FIG. 4 illustrates the link table 5 of the node G illustrated in FIG. 3.

The link table 5 stores the link information about the link to the adjacent node. The link information includes "adjacent node", "outgoing-link evaluation value", "incoming-link evaluation value", and "link weight". The "adjacent node"

identifies the node to which the link is connected. The "outgoing-link evaluation value" indicates the quality of the outgoing-link for the adjacent node. The "incoming-link evaluation value" indicates the quality of the incoming-link for the adjacent node. The "link weight" indicates an average of the "outgoing-link evaluation value" and the "incoming-link evaluation value".

For example, the link information registered in the first record illustrated in FIG. 4 expresses the following contents.
Adjacent node: Z
Outgoing-link evaluation value (quality of link from node Z to node G): 11
Incoming-link evaluation value (quality of link from node G to node Z): 9
Link weight (quality of link between node G and node 2)

FIG. 5 illustrates an example of the routing table 6. FIG. 5 illustrates the routing table 6 of the node A illustrated in FIG. 3.

The routing table 6 stores the route information for each destination node. In this embodiment, "global destination (GD)", "local destination (LD)", "route weight", "link weight", and the "route evaluation value" are registered in the routing table 6. The "global destination" identifies the destination node of a packet. Therefore, the "global destination" may be referred to as "final destination equipment". The "local destination" refers to an adjacent node located on the route for forwarding a packet to the destination node.

The "route weight" indicates the communication cost of the route from the "local destination" to the "global destination". In this embodiment, the "route weight" indicates the total link weight of each link on the route from the "local destination" to the "global destination". The "link weight" indicates the weight of the link to the "local destination". The "route evaluation value" corresponds to the total communication cost with respect to the route to the global destination, and is calculated by, for example, the sum of the "route weight" and the "link weight".

In the first and second records in the routing table 6 illustrated in FIG. 5, the route information about the global destination node Z is registered. The first record indicates the route information about the route from the node A to the node Z through the node Y. That is, the "link weight" of the first record indicates the link weight between the nodes A and Y. The "route weight" of the first record indicates the sum of the link weight between the nodes Y and G and the link weight between the nodes G and Z. The "route evaluation value" of the first record indicates the quality (communication cost) of the route from the node A to the node Z through the nodes Y and G. On the other hand, the second record indicates the route information about the route from the node A to the node Z through the node X. That is, the "link weight" of the second record indicates the link weight between the nodes A and X. The "route weight" of the second record indicates the sum of the link weight between the nodes X and G and the link weight between the nodes G and Z. The "route evaluation value" of the second record indicates the quality of the route from the node A to the node Z through the nodes X and G.

Thus, in the example illustrated in FIGS. 3 and 5, the node equipment A has two routes for transmitting a packet to the node Z; one is a route via the local destination node Y (hereafter referred to as a route Y/Z) and the other is a route via the local destination node X (hereafter referred to as a route X/Z). When the node equipment A transmits or forwards a packet to the node Z, the node equipment A selects the route having the smallest evaluation value in the routes whose global destination is the node Z. In the example illustrated in FIG. 5, the evaluation value of the route YZ is 21, and the evaluation value of the route X/Z is 24. Therefore, in this case, when the node equipment A transmits or forwards a packet to the node Z, the route Y/Z is selected. That is, the node equipment A selects the node Y as the optimum local destination for transmitting for forwarding a packet to the node Z.

Similarly, each node equipment refers to the routing table 6 based on the "global destination" of a received packet, and selects the optimum local destination node. Thus, in the multi-hop wireless network according to the present embodiment, a packet is forwarded to the global destination through the optimum route.

The radio environment is variable depending on various factors. For example, when an obstacle appears between the nodes, the quality of the link between the nodes is degraded. Such a state occurs due to, for example, the construction of a building etc. When the quality of the link varies, the contents of the link table and the routing table are updated in the surrounding nodes. Therefore, the optimum route for forwarding a packet from the source node to the destination node may be changed. That is, in the multi-hop wireless network, the optimum route for forwarding a packet from the source node to the destination node is not constant, but may be changed due to various factors.

In the multi-hop wireless network according to an embodiment of the present invention, each node equipment autonomously forwards a packet with reference to the routing table 6.

Figure 6:
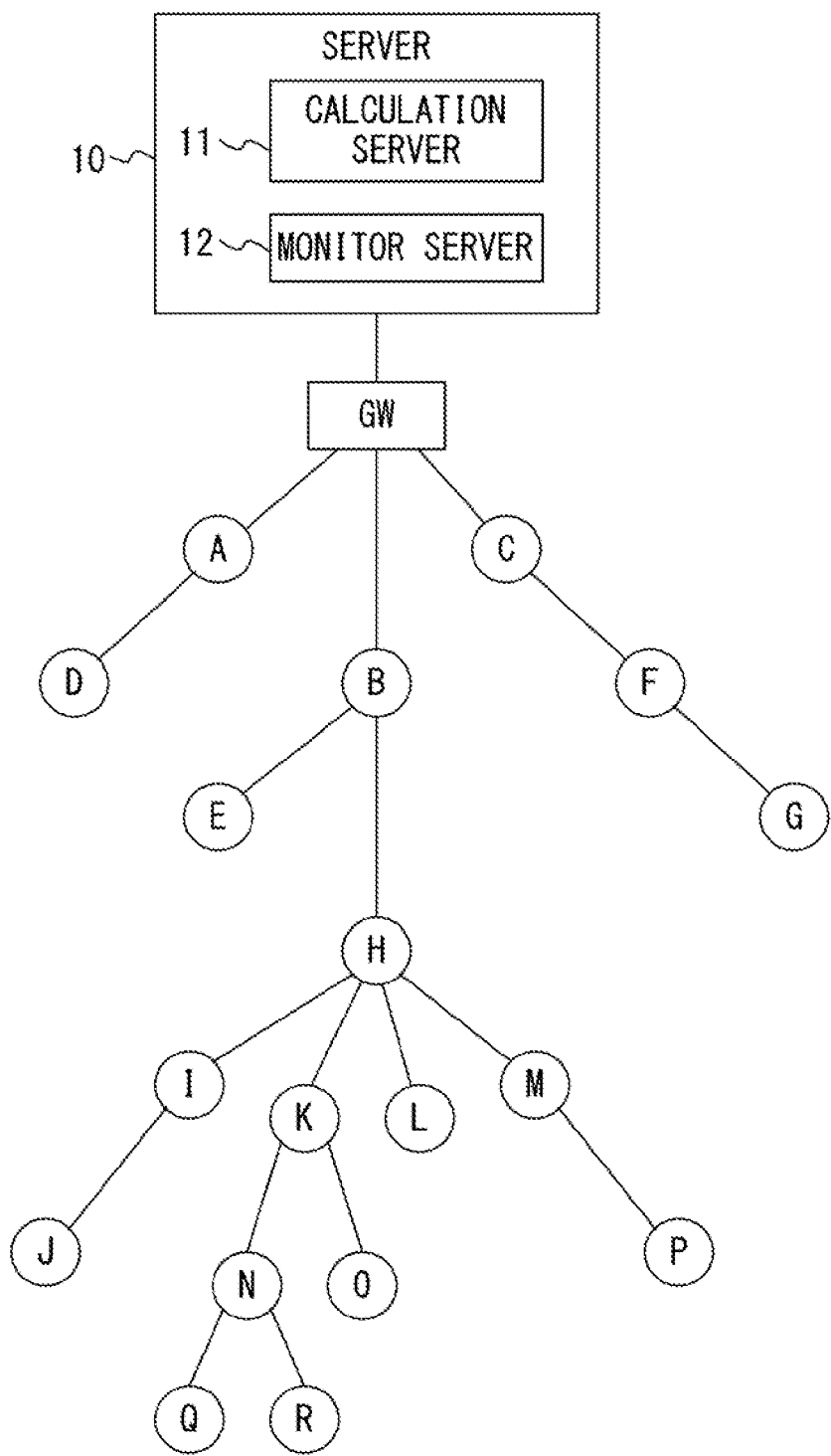
FIG. 6 illustrates a configuration of a multi-hop wireless network according to an embodiment of the present invention.

FIG. 6 illustrates a configuration of a multi-hop wireless network according to an embodiment of the present invention. In the example illustrated in FIG. 6, the multi-hop wireless network includes the node equipments A through R, and GW.

To each of the node equipments A through R, a data collection device for collecting specified data is connected. The data collection device is, for example, a sensor for measurement the temperature etc. A user may connect the data collection device for collecting desired data to the node equipment. Furthermore, each of the node equipments A through R generates a data packet which stores data collected by the data collection device, and transmits the data packet to a server 10. In this case, each of the node equipments A through R generates and transmits, for example, a data packet periodically. The node GW is set at the destination address of the data packet to be transmitted from each of the nodes A through R to the server 10. By so doing, the data packet is autonomously forwarded by each node equipment. The routing table 6 of each node equipment stores the routing information indicating the optimum route for each destination node. Therefore, each data packet may be forwarded to the node GW through the optimum route.

The solid line for connecting the nodes illustrated in FIG. 6 indicates the link for providing the optimum route to the node GW. For example, when a packet in which the node GW is set as the destination address is transmitted from the node J, the packet is forwarded to the node GW through the nodes I, H and B.

The node equipment GW is connected to at least one of the node equipments A through R. In the example illustrated in FIG. 6, the nodes A, B and C are connected to the node equipment GW. The node equipment GW is also connected to the server 10. The node equipment GW and the server 10 may be directly connected, and may be connected through the Internet, a carrier network, etc. The node equipment GW forwards a data packet received from the nodes A through R to the server 10. That is, the node equipment GW may function as gateway equipment between the node equipments A through R and the server 10.

The server 10 includes one or more computers. When the server 10 includes a plurality of computers, the plurality of computers are connected to one another through a LAN etc. The server 10 includes a calculation server 11 and a monitor server 12.

The calculation server 11 receives a data packet transmitted from each of the nodes A through R through the node GW. Then, the calculation server 11 acquires the data stored in each data packet and performs a specified calculation on the acquired data. That is, the calculation server 11 may perform a specified calculation on data collected by the data collection device provided in each of the nodes A through R.

The monitor server 12 monitors the state of the multi-hop wireless network. In this example, the monitor server 12 specifies a node whose state or performance has been degraded in the nodes A through R in the multi-hop wireless network.

In the present embodiment, the monitor server 12 specifies the node whose state or performance has been degraded based on a monitor packet received from the multi-hop wireless network. In the present embodiment, the monitor packet is generated by the node equipment located in the uppermost stream with respect to the monitor server 12 (that is the node GW).

The uppermost node equipment located in the uppermost stream with respect to the node GW does not "relay" a packet addressed to the node GW. Therefore, when node equipment does not relay a packet addressed to the node GW in a specified period of time, it is decided that the node equipment is located in the uppermost stream with respect to the node GW. Otherwise, since the node equipment which is not specified as a local destination corresponding to the node GW in an adjacent node does not relay a packet addressed to the node GW, the node equipment is also decided as being located in the uppermost stream with respect to the node GW. The method for deciding whether or not each node equipment is located in the uppermost stream with respect to the node GW is not specifically limited, but may be an optional method.

Each node equipment includes the uppermost flag storage unit 7 as illustrated in FIG. 2. The uppermost flag storage unit 7 stores an uppermost flag. The uppermost flag indicates whether or not the node equipment is located in the uppermost stream with respect to a specified destination node. In the present embodiment, the uppermost flag for the node GW is stored. Therefore, by referring to the uppermost flag, each node equipment can recognize whether or not the node equipment itself is located in the uppermost stream with respect to the monitor server 12 or the node GW.

In the example illustrated in FIG. 6, the nodes D, E, J, Q, R, O, L, P and G are located in the uppermost stream with respect to the monitor server 12 (that is, the node GW). That is, each of the nodes D, E, J, Q, R, O, L, P and G periodically generates and transmits a monitor packet.

In the example illustrated in FIG. 6, the calculation server 11 and the monitor server 12 are provided in the same server, but the calculation server 11 and the monitor server 12 may be provided in different servers. In this case, the calculation server 11 and the monitor server 12 may be connected to different nodes.

FIG. 7 illustrates an example of a monitor packet. The monitor packet includes a global destination, a global source, a local destination, a local source, a monitor data flag, a worst node ID, and worst node data. The monitor packet may include other information items. Although not specifically limited, specified header information may be added to the monitor packet.

The global destination (GD) indicates an address of the final destination node. In this example, the global destination is the node GW. The global destination is not rewritten on the way to the final destination node in the multi-hop wireless network.

The global source (GS) indicates an address of the node equipment which has generated the monitor packet. In this example, the global source is also not rewritten on the way to the final destination node in the multi-hop wireless network.

The local destination (LD) indicates an address of the node to which a packet is to be forwarded. That is, the local destination indicates the address of the adjacent node in the optimum route to the global destination. The local destination corresponding to the global destination is registered in the routing table 6 as illustrated in FIG. 5. When the node equipment is specified by the local destination of a received packet, the node equipment acquires the corresponding local destination by referring to the routing table 6 using the global destination of the packet. Then, the node equipment sets in the packet the local destination acquired from the routing table 6, and transmits the packet. That is, the local destination set in the packet is sequentially rewritten by the node equipments in the route to the global destination in the multi-hop wireless network.

The local source (LS) indicates an address of the node from which a packet is transferred. Therefore, the local source is also sequentially rewritten by the node equipments in the route to the global destination in the multi-hop wireless network.

The monitor data flag indicates whether or not the packet stores the monitor data. That is, the monitor data flag indicates whether or not the packet is the monitor packet. One bit may be assigned for the monitor data flag, for example. In this case, if a packet is the monitor packet, "monitor data flag=1" is set. On the other hand, if the packet is not the monitor packet, "monitor data flag=0" is set.

The worst node ID identifies a node whose state or performance is the worst in the route through which the monitor packet is forwarded to the node GW. The worst node data indicates the monitor data detected in the node identified by the worst node ID. That is, the worst node data indicates the worst state or performance of the node in the route through which the monitor packet is forwarded to the node GW.

Figure 8:
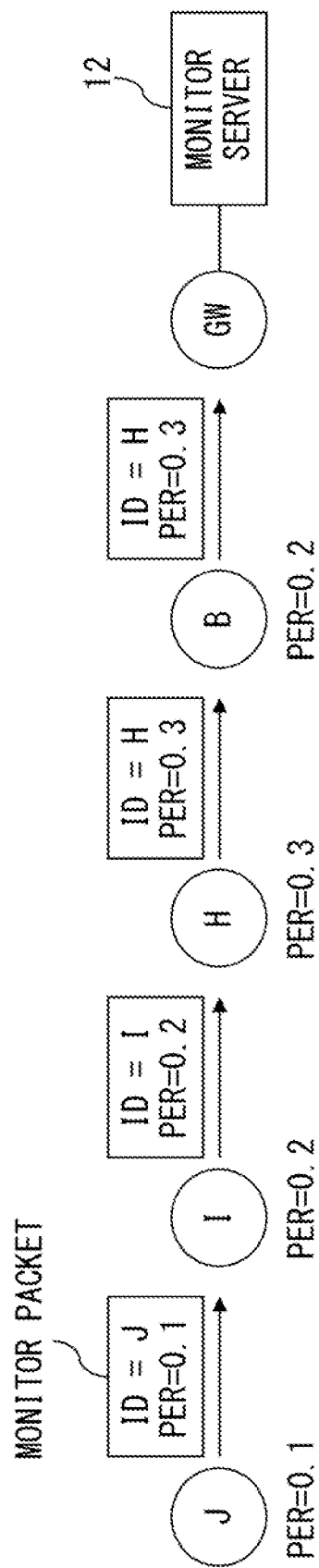
FIG. 8 is an explanatory view of the outline of a monitor method according to the embodiment.

FIG. 8 is an explanatory view of the outline of a monitor method according to the embodiment. Each node equipment in the multi-hop wireless network has the function of detecting the state or performance of the local node, and acquiring monitor data. In the example illustrated in FIG. 8, each node equipment detects a packet error rate (PER) as the monitor data.

In the above-mentioned multi-hop wireless network, each node equipment located in the uppermost stream with respect to the node GW periodically transmits the monitor packet illustrated in FIG. 7. In this example, assume that the node J is the uppermost node. That is, FIG. 8 illustrates an operation example that the node equipment J generates a monitor packet and transmitting the packet to the monitor server 12.

First, the node equipment J generates a monitor packet illustrated in FIG. 7. The addresses are set in the monitor packet as follows.
Global destination GD: node GW
Global source GS: node J
Local destination LD: node I
Local source LS: node J
Note that the local destination is acquired by referring to the routing table of the node J.

"1" is written to the monitor data flag as an initial flag. The "node J" is written to the worst node ID as initial information. Furthermore, the packet error rate (that is, PER=0.1) detected in the node equipment J is written to the worst node data.

The node equipment J transmits the monitor packet. By so doing, the monitor packet is received by the node equipment I. This monitor packet may reach other node equipments. However, since the local destination of the monitor packet specifies the node I, the other node equipments discard the monitor packet.

The node equipment I extracts the worst node data from the received monitor packet. That is, in the node equipment I, "PER=0.1" is extracted from the monitor packet. Here, the worst node data indicates the worst value of the packet error rate of the node equipments (not including the node equipment I) on the route from the source node (that is, the node J) of the monitor packet to the current node (that is, the node I).

The node equipment I compares the packet error rate extracted from the monitor packet with the packet error rate of the node equipment I. In this example, the packet error rate of the node equipment I is 0.2, and is worse than the packet error rate extracted from the monitor packet. That is, the packet error rate of the node equipment I is the worst in the packet error rates of the node equipments J and I. In this case, the node equipment I rewrites the worst node data of the monitor packet with the packet error rate of the node equipment I. Furthermore, the node equipment I rewrites the worst node ID of the monitor packet with the address of the node ID. As a result, a monitor packet including the "worst node ID=I" and the "worst PER=0.2" is generated by the node equipment I.

The node equipment I forwards the monitor packet to the node GW. In this case, the "node H" is set in the local destination LD, and the "node I" is set in the local source LS.

The node equipment H receives the above-mentioned monitor packet from the node I. Then, as with the node equipment I, the node equipment H extracts the worst node data from the received monitor packet. That is, in the node equipment H, "PER=0.2" is extracted from the monitor packet. In this case, the worst node data indicates the worst value of the packet error rate of the node equipments (not including the node equipment H) in the route from the source node (that is, the node J) of the monitor packet to the current node (that is, the node H).

The operation of the node equipment H which has received the monitor packet is substantially the same as the operation of the node equipment I. That is, the node equipment H compares the packet error rate extracted from the monitor packet with the packet error rate of the node equipment H. In this example, the packet error rate of the node equipment H is 0.3, and is worse than the packet error rate extracted from the monitor packet. That is, the packet error rate of the node H is the worst in the packet error rates of the node equipments J, I, and H. In this case, the node equipment H rewrites the worst node data of the monitor packet with the packet error rate of the node equipment H. Furthermore, the node equipment H rewrites the worst node ID of the monitor packet with the address of the node equipment H. As a result, a monitor packet including the "worst node ID=H" and the "worst PER=0.3" is generated.

As with the node equipment I, the node equipment H forwards the monitor packet to the node GW. In this case, the "node B" is set in the local destination LD, and the "node H" is set in the local source LS.

The node equipment B receives the above-mentioned monitor packet from the node H. Then, as with the node equipment H, the node equipment B extracts the worst node data from the received monitor packet. That is, in the node equipment B, "PER=0.3" is extracted from the monitor packet. In this case, the worst node data indicates the worst value in the packet error rates of the node equipments (not including the node equipment B) in the route from the source node (that is, the node J) of the monitor packet to the current node (that is, the node B).

The operation of the node equipment B which has received the monitor packet is similar to the operation of the node equipment I or H. That is, the node equipment B compares the packet error rate extracted from the monitor packet with the packet error rate of the node equipment B. However, the packet error rate of the node equipment B is 0.2, and is better than the packet error rate extracted from the monitor packet. That is, the packet error rate of the node B is not the worst in the packet error rates of the node equipments J, I, H and B. In this case, the node equipment B does not rewrite the worst node data of the monitor packet. Furthermore, the node equipment B does not rewrite the worst node ID of the monitor packet. As a result, the monitor packet including the "worst node ID=H" and the "worst PER=0.3" is forwarded from the node B to the node GW.

As described, the monitor packet generated by the node equipment J is forwarded by the nodes I, H and B, and reaches the node GW. In this case, if the packet error rate of the local node is worse than the packet error rate written in the received monitor packet, then the node equipment in the route writes the packet error rate of the local node and the ID of the local node to the monitor packet. Therefore, the monitor server 12 can acquire the worst value of the packet error rates of the node equipments J, I, H and B, and the node ID for identifying the node whose worst value has been detected by receiving the monitor packet.

In the method in which each node equipment generates the monitor packet and transmits the packet to the monitor server, the volume of the data to be processed by the monitor server becomes large, and the traffic related to the monitor of the network also becomes large. In the example in FIG. 8, since the monitor packet is respectively transmitted from the node equipments J, I, H and B, the monitor server processes four monitor packets.

On the other hand, according to the method of the present embodiment, the monitor server 12 can specify the worst node in the route by transmitting one monitor packet from the node equipment J to the monitor server 12. In this case, a part of the function of searching the worst node is realized by the node equipments on the multi-hop wireless network. Here, comparing operation between the PER stored in the received monitor packed and the PER detected in the local node performed in each of the relevant nodes is a part of the function of searching the worst node. Therefore, if the method of the present embodiment is compared with the above-mentioned method (a method in which each node equipment transmits a monitor packet to the monitor server), the amount of data processed by the monitor server 12 is reduced, and the traffic related to the monitor of the network is also reduced.

FIG. 8 illustrates the operation when a monitor packet is transmitted from one node (node J), but the monitor packet is transmitted from each uppermost node as described above. For example, in the multi-hop wireless network illustrated in FIG. 6, a monitor packet is transmitted to the node GW respectively from the eight uppermost nodes (D, E, J, Q, R, O, L, P and G). In this case, each monitor packet notifies the monitor server 12 of the worst node in the corresponding propagation route and the monitor data detected by the worst node. Therefore, the monitor server 12 can recognize the worst node in the propagation route through which corresponding monitor packet is forwarded, and the monitor data detected by the worst node. For example, the monitor server 12 can recognize the worst node in the nodes P, M, H and B and the monitor data detected by the worst node based on the monitor packet transmitted from the node P.

The monitor server 12 may specify the worst node in state or performance in the multi-hop wireless network by using the monitor data of the worst node in respective routes. In this case, the monitor server 12 may specify two or more worst nodes in state or performance in the multi-hop wireless network.

When the monitor server 12 specifies the node in a poor state or performance, a user or a network administrator may improve the state of the multi-hop wireless network as described below. For example, the user or the network administrator may arrange a new node near the node in a poor state or performance. In this case, a part of the traffic handled by the node in a poor state or performance is assigned to the new node. Therefore, the bottleneck of the traffic is solved or suppressed.

Figure 9:
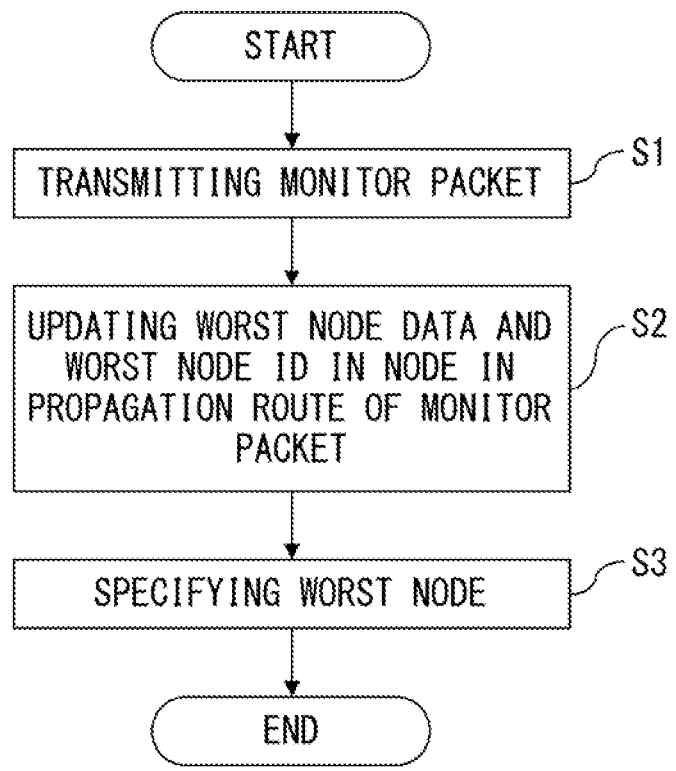
FIG. 9 is a flowchart illustrating a monitor method according to the embodiment.

FIG. 9 is a flowchart illustrating a monitor method according to the embodiment. The processing of this flowchart is performed by one or more node equipments and the monitor server 12 in the multi-hop wireless network.

In step S1, the node equipment transmits a monitor packet. The monitor packet is, for example, transmitted from the node equipment located in the uppermost stream with respect to the monitor server 12. However, other node equipments in the multi-hop wireless network may transmit a monitor packet.

In step S2, the node equipment in the propagation route from the source of the monitor packet to the monitor server 12 rewrites the worst node ID and the worst node data stored in the monitor packet if needed. That is, when the state or the performance of the node equipment which has received the monitor packet is worse than the state or the performance represented by the worst node data stored in the monitor packet, the worst node ID and the worst node data of the monitor packet are rewritten by the node equipment. Therefore, the worst node ID and the worst node data stored in the monitor packet indicate the worst node in the propagation route from the source node to the current node and the state or performance detected by the worst node, respectively. Step S2 is performed in each node equipment in the propagation route from the source of the monitor packet to the monitor server 12.

Then, in step S3, the monitor server 12 specifies the worst node based on the received monitor packet. Thus, the monitor server 12 can specify the worst node in the propagation route from the source node of the monitor packet to the gateway GW.

Figure 10:
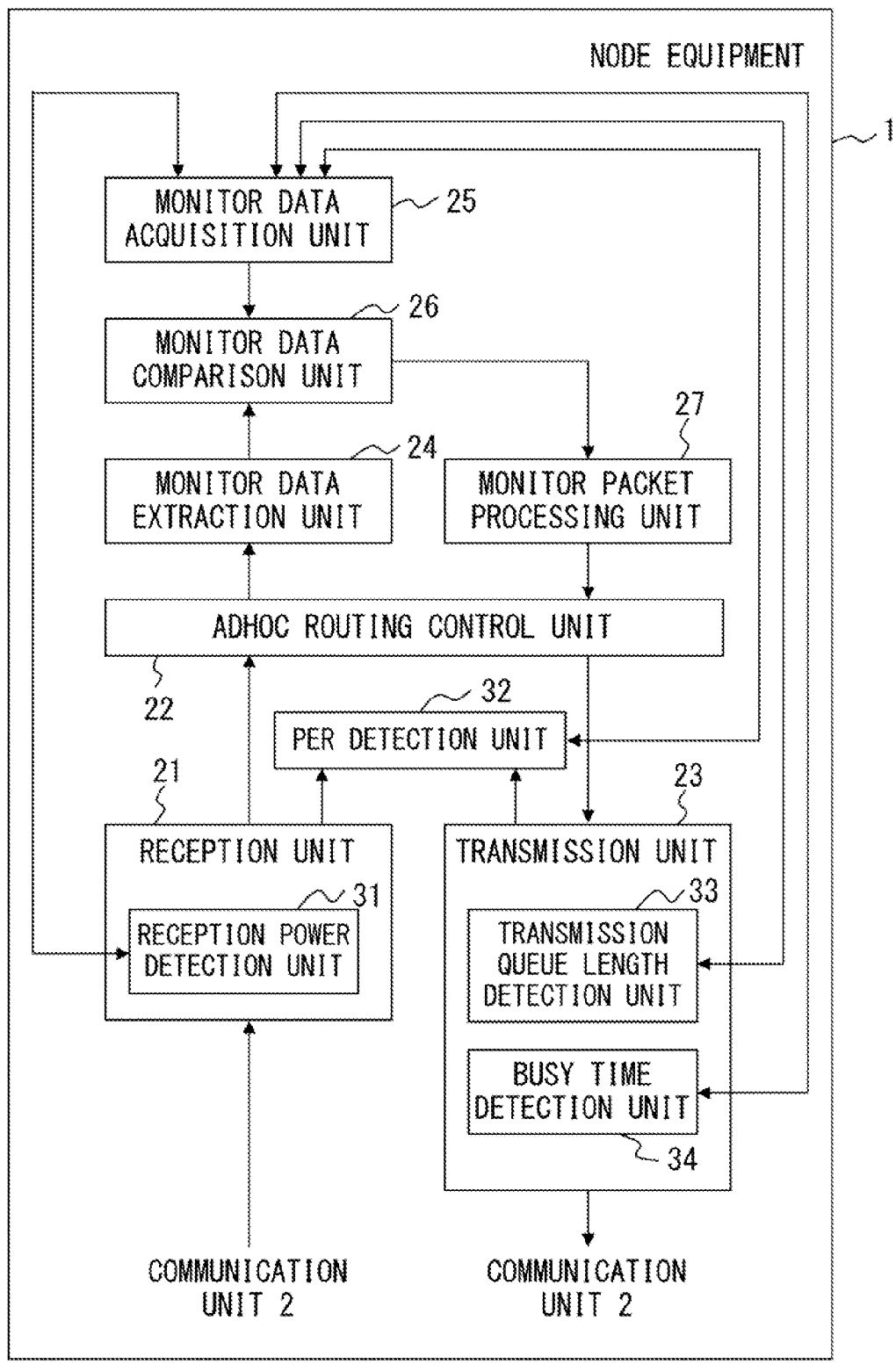
FIG. 10 is a block diagram of the function of node equipment.

FIG. 10 is a block diagram for explanation of the function of node equipment. In FIG. 10, the function not directly related to the process of forwarding a monitor packet is omitted.

As illustrated in FIG. 10, the node equipment 1 includes a reception unit 21, an ad-hoc routing control unit 22, a transmission unit 23, a monitor data extraction unit 24, a monitor data acquisition unit 25, a monitor data comparison unit 26, and a monitor packet processing unit 27. The reception unit 21, the ad-hoc routing control unit 22, the transmission unit 23, the monitor data extraction unit 24, the monitor data acquisition unit 25, the monitor data comparison unit 26, and the monitor packet processing unit 27 are realized by, for example, executing the control program 8 in the control unit (processor) 4 illustrated in FIG. 2. However, a part of the reception unit 21, the ad-hoc routing control unit 22, the transmission unit 23, the monitor data extraction unit 24, the monitor data acquisition unit 25, the monitor data comparison unit 26, and the monitor packet processing unit 27 may be realized by hardware circuit.

The reception unit 21 receives a packet transmitted from an adjacent node. The radio signal transmitted from an adjacent node is demodulated by the communication unit 2 illustrated in FIG. 2. The communication unit 2 recovers a data string from the demodulated signal. Then, the reception unit 21 composes a packet from the data string recovered by the communication unit 2.

Furthermore, the reception unit 21 checks the local destination of the received packet. If the local destination of the received packet specifies the node equipment 1, the reception unit 21 feeds the received packet to the ad-hoc routing control unit 22. On the other hand, if the local destination of the received packet specifies another node equipment, then the reception unit 21 discards the received packet.

The ad-hoc routing control unit 22 checks the monitor data flag of the received packet. If the monitor data flag of the received packet is "zero (non-monitor packet)", the ad-hoc routing control unit 22 performs normal forwarding control. That is, the ad-hoc routing control unit 22 refers to the routing table 6 using the global destination of the received packet, and acquires the corresponding local destination. Then, the ad-hoc routing control unit 22 rewrites the local destination of the received packet with the local destination acquired from the routing table 6, and then feeds the packet to the transmission unit 23.

The transmission unit 23 includes a transmission queue buffer for temporarily storing a packet output via the communication unit 2. When the transmission unit 23 acquires the transmission right of the multi-hop wireless network, the transmission unit 23 retrieves the packet stored at the head of the transmission queue buffer, and outputs the retrieved packet. The packet output from the transmission unit 23 is converted by the communication unit 2 into a radio signal, and is transmitted to the adjacent node.

If the monitor data flag of the received packet is "1 (monitor packet)", then the ad-hoc routing control unit 22 decides that the received packet is a monitor packet. In this case, the ad-hoc routing control unit 22 temporarily stores the received packet.

The monitor data extraction unit 24 extracts the monitor data stored in the received monitor packet. The monitor data corresponds to the worst node data in the example illustrated in FIG. 7. The monitor data indicates, for example, the reception power, the packet error rate, the transmission queue length, or the wireless band use rate (busy time).

The monitor data acquisition unit 25 acquires the monitor data detected by the node equipment 1. The monitor data is detected by a reception power detection unit 31, a PER detection unit 32, a transmission queue length detection unit 33, or a busy time detection unit 34 which are described later. Thus, the monitor data acquisition unit 25 acquires the monitor data detected by the reception power detection unit 31, the PER detection unit 32, the transmission queue length detection unit 33, or the busy time detection unit 34.

The monitor data comparison unit 26 compares the monitor data extracted from the monitor packet by the monitor data extraction unit 24 with the monitor data of the node equipment 1 acquired by the monitor data acquisition unit 25. The monitor packet processing unit 27 processes the monitor packet based on the comparison result by the monitor data comparison unit 26.

Figure 11:
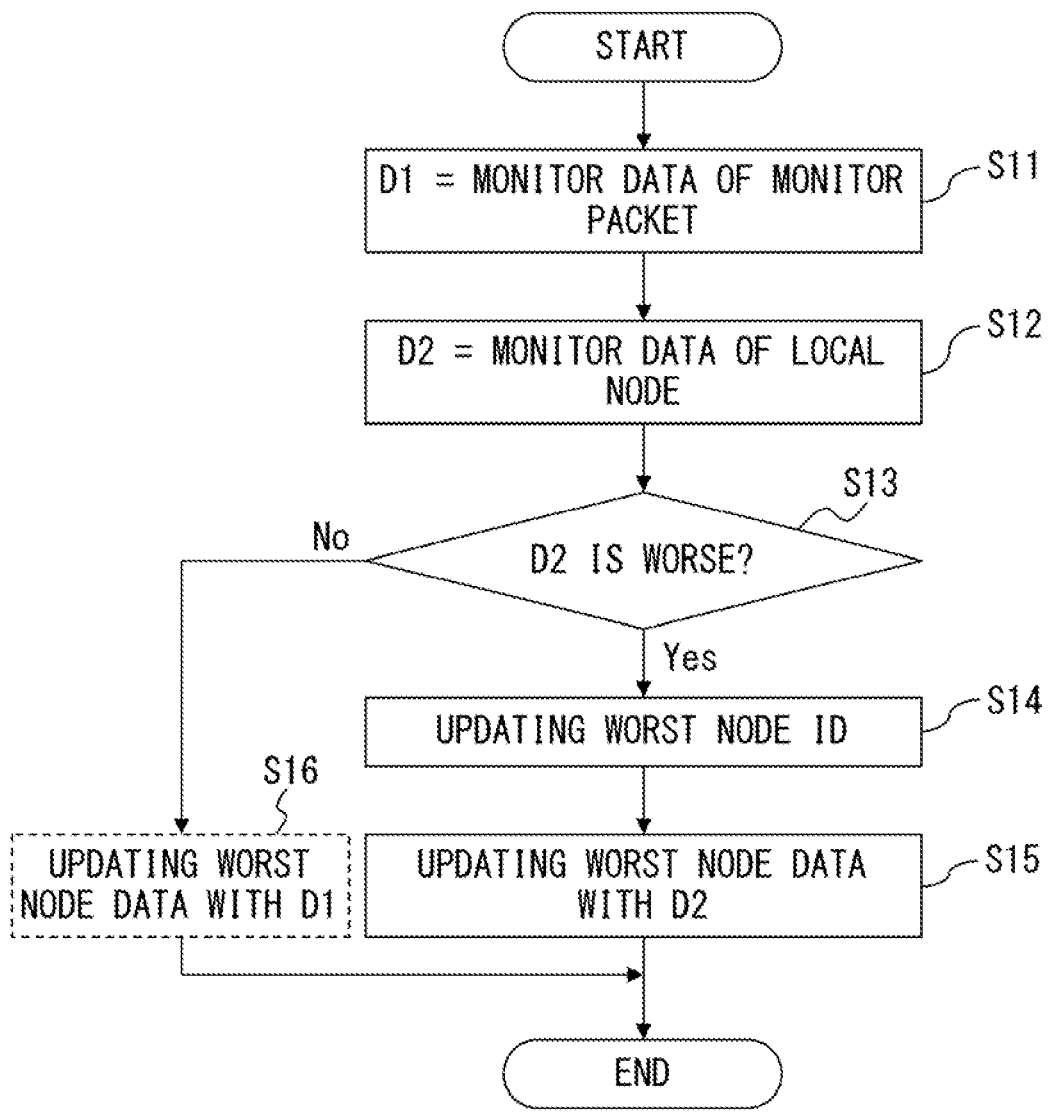
FIG. 11 is a flowchart illustrating the operation of a monitor data comparison unit and a monitor packet processing unit.

FIG. 11 is a flowchart illustrating the operation of the monitor data comparison unit 26 and the monitor packet processing unit 27. The process of this flowchart is executed when the node equipment 1 receives a monitor packet.

In step S11, the monitor data comparison unit 26 provides a variable D1 with the monitor data extracted by the monitor data extraction unit 24 from the monitor packet. In step S12, the monitor data comparison unit 26 provides a variable D2 with the monitor data of the node equipment 1 acquired by the monitor data acquisition unit 25. In step S13, the monitor data comparison unit 26 compares the variable D1 with the variable D2. When the monitor data is reception power, a smaller value of the monitor data indicates that the state of the node is worse. Furthermore, when the monitor data is the packet error rate, the transmission queue length, or the busy time, a larger value of the monitor data indicates that the state of the node is worse.

When the monitor data detected by the node equipment 1 is worse than the monitor data extracted from the monitor packet (YES in step S13), the monitor packet processing unit 27 updates in step S14 the "worst node ID" of the monitor packet stored in the ad-hoc routing control unit 22. In this case, the address of the node equipment 1 is written to the worst node ID. Furthermore, the monitor packet processing unit 27 updates the "worst node data" of the monitor packet in step S15. In this case, the variable D2 (that is, the monitor data detected by the node equipment 1) is written to the worst node data in the monitor packet.

On the other hand, when the monitor data detected in the node equipment 1 is better than or equal to the monitor data extracted from the monitor packet (NO in step S13), the monitor packet processing unit 27 writes the variable D1 (that is, the monitor data extracted from the monitor packet) to the "worst node data" of the monitor packet stored in the ad-hoc routing control unit 22 in step S26. However, the worst node data to be written to the monitor packet in step S16 is equal to the worst node data that has been written in the monitor packet. Therefore, the process in step S16 may be omitted.

The monitor packet processing unit 27 processes the monitor packet stored in the ad-hoc routing control unit 22 as indicated by the flowchart illustrated in FIG. 11 based on the result of the comparison by the monitor data comparison unit 26. Then, the ad-hoc routing control unit 22 performs the routing process of the monitor packet. The routing process of the monitor packet is similar to the process of the normal data packet according to the routing table 6. After that, the transmission unit 23 transmits the monitor packet.

As described above, in the monitor method according to the present embodiment, the information for specifying the worst node is stored in the monitor packet for each propagation route of the monitor packet. That is, in the monitor method according to the present embodiment, a part of the process of specifying a node in a poor state or performance is performed by node equipments. Therefore, the monitor method according to the present embodiment has the following advantages over the method of transmitting monitor data respectively from all node equipments to the monitor server 12.
(1) Processing amount in the monitor server 12 is reduced.
(2) Traffic for notifying the monitor server 12 of the state from the multi-hop wireless network is reduced.
(3) Capacity of a memory implemented in the monitor server 12 for storing monitor data received from the multi-hop wireless network is reduced.

<Monitor Data>

The monitor method according to the present embodiment may select monitor data depending on what type of node is to be found. For example, when a node in a poor radio wave environment is specified, reception power or a packet error rate may be used as monitor data. Furthermore, when a node in a congestion state is specified, a transmission queue length or a wireless band use rate (that is, a busy time) may be used as monitor data.

The reception power detection unit 31 detects reception power for each link. In this case, the reception power detection unit 31 may detect reception power for each link registered in the link table 5. Then, the monitor data acquisition unit 25 acquires the reception power of each link of the node equipment 1 by accessing the reception power detection unit 31.

Figure 12:
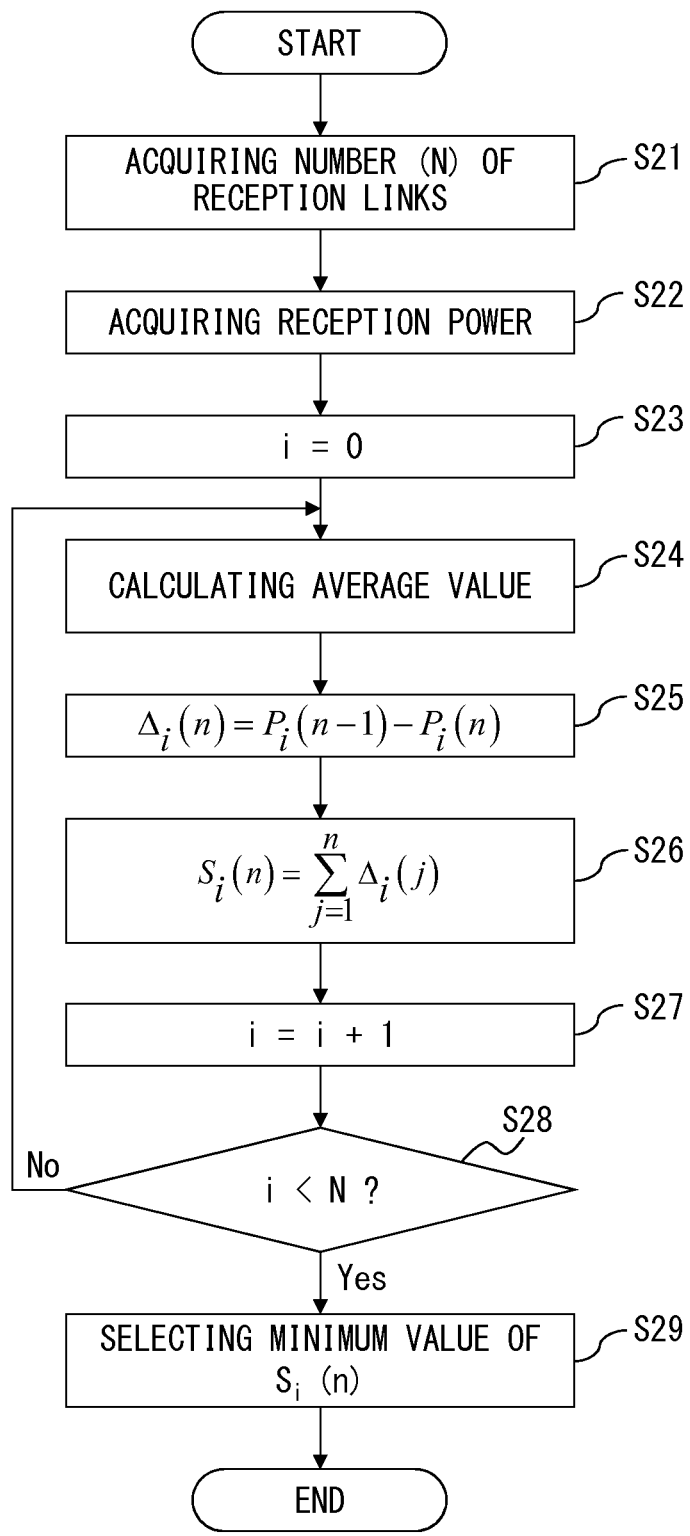
FIG. 12 is a flowchart illustrating the operation of a monitor data acquisition unit when monitor data is reception power.

FIG. 12 is a flowchart illustrating the operation of the monitor data acquisition unit 25 when the monitor data is reception power. In this example, it is assumed that the reception power detection unit 31 periodically or continuously detects reception power for each link.

In step S21, the monitor data acquisition unit 25 counts the number of reception links. In this example, it is assumed that the reception power detection unit 31 detects the reception power for N links. In step S22, the monitor data acquisition unit 25 acquires reception power data for each link from the reception power detection unit 31. The reception power data is, for example, the time-series data of periodically detected reception power.

In step S23, the monitor data acquisition unit 25 initializes a variable i to 0. The variable i identifies each link whose reception power has been detected. Hereafter, the monitor data acquisition unit 25 performs the processes in steps S24 through S27 for each link.

In step S24, the monitor data acquisition unit 25 calculates the average value Pi(n) of reception power for the link i. The average is not limited, but may be, for example, a simple average, a moving average, a weighted average, etc. The average is calculated using, for example, a reception power value sampled for a period of time corresponding to a specified number of packets (for example, 10 through 20 packets).

In step S25, the monitor data acquisition unit 25 calculates the difference Ai(n) between the previous average value Pi(n−1) and the current average value Pi(n). That is, the following calculation is performed.

$$\Delta i(n) = Pi(n-1) - Pi(n)$$

Each of the average values Pi(n−1), Pi(n), . . . is calculated at specified intervals. For example, to detect the state in which a radio wave environment gradually changes due to the construction of a building etc., the average values Pi(n−1), Pi(n), . . . may be calculated at long time intervals (for example, once a day). On the other hand, to detect a change in radio wave environment in a relatively short period of time, it is necessary to calculate an average at shorter time intervals.

In step S26, the monitor data acquisition unit 25 acquires a reception power evaluation value Si(n) by performing a cumulative addition or an integration on the difference Ai above. That is, the following calculation is performed.

$$S_i(n) = \sum_{j=1}^{n} \Delta_i(j)$$

In steps S27 and S28, the monitor data acquisition unit 25 increments the variable i by 1. If the variable i is smaller than N (the number of links), the process of the monitor data acquisition unit 25 returns to step S24. On the other hand, when the variable i reaches N, the process of the monitor data acquisition unit 25 moves to step S29.

In steps S24 through S28 above, the reception power evaluation value Si(n) is calculated for each link. Then, the monitor data acquisition unit 25 selects the minimum value from the reception power evaluation values Si(n) calculated for respective links in step S29. Then, the monitor data acquisition unit 25 outputs the selected minimum value as monitor data.

The reception power evaluation value S does not indicate the reception power at a specified time point, but a change with of the reception power respect to time. For example, in an area in which a radio wave environment is constant, the difference Δ is zero. Therefore, the reception power evaluation value S is also zero. On the other hand, for example, in the area in which a radio wave environment is gradually degraded due to the construction of a building or the like, the difference Δ is a negative value, and the reception power evaluation value S is also a negative value. Therefore, if the reception power evaluation value S is used as monitor data, the monitor server 12 can find the node whose radio wave environment is degraded in advance even if the monitor server 12 does not recognize the topology of the multi-hop wireless network.

The PER detection unit 32 calculates a packet error rate based on the data transmission notification received from the transmission unit 23 and the ACK reception notification received from the reception unit 21. The transmission unit 23 issues a data transmission notification each time a packet is transmitted. Furthermore, the reception unit 21 issues an ACK reception notification each time an ACK packet corresponding to the packet transmitted from the transmission unit 23 is received. Then, the PER detection unit 32 calculates a packet error rate based on the ratio of the number of the data transmission notifications and the number of the ACK reception notifications.

When the monitor server 12 uses the packet error rate as monitor data, the monitor data acquisition unit 25 accesses the PER detection unit 32, and acquires the packet error rate of the node equipment 1. The monitor data acquisition unit 25 may calculate the evaluation value indicating the change of the packet error rate with respect to time as with the reception power. That is, the monitor server 12 may specify a degraded node based on the change of the packet error rate with respect to time.

The transmission queue length detection unit 33 detects the transmission queue length of the transmission unit 23. The transmission queue length detection unit 33 may detect the transmission queue length based on, for example, the use rate of the transmission queue buffer. The transmission queue length detection unit 33 may also detect the transmission queue length based on the number of packets stored in the transmission queue buffer.

When the monitor server 12 uses the transmission queue length as monitor data, the monitor data acquisition unit 25 accesses the transmission queue length detection unit 33, and acquire the transmission queue length of the node equipment 1. In this case, the monitor data acquisition unit 25 acquires the average value of the transmission queue length as monitor data.

The busy time detection unit 34 measures the wait time in which the transmission unit 23 of the node equipment 1 acquires the transmission right in the network. The multi-hop wireless network has the function of avoiding the collision among the packets. That is, each node equipment is incapable of acquiring the transmission right while a packet is being transmitted from an adjacent node. Whether or not a packet is being transmitted from an adjacent node may be decided by monitoring reception power. That is, if the reception power is higher than a specified threshold level, then it is decided that a packet is being transmitted from an adjacent node. Therefore, the busy time detection unit 34 may detect the busy time by monitoring the period of time in which the reception power is higher than a specified threshold level when a packet is stored in the transmission queue buffer.

When the monitor server 12 uses the wireless band use rate (that is, the busy time) as monitor data, the monitor data acquisition unit 25 accesses the busy time detection unit 34, thereby acquiring the busy time of the node equipment 1. Then, the monitor data acquisition unit 25 acquires, for example, the average value of the busy time as monitor data.

If the transmission queue length is used as monitor data, the monitor server 12 may specify a node in congestion state. Furthermore, if the wireless band use rate is used as monitor data, the monitor server 12 may specify the area in which the congestion state is detected.

Other Embodiments

In the embodiment above, the node equipment in the uppermost stream with respect to the monitor server 12 generates and transmits a monitor packet, but the present invention is not limited to this method. That is, another node equipment in the multi-hop wireless network may generate and transmit a monitor packet. For example, when a specified time has passed since node equipment relays a previous monitor packet, the node equipment may generate and transmit a new monitor packet.

In the embodiment above, the monitor packet stores one worst node ID and corresponding worst node data. However, the present invention is not limited to this method. That is, a monitor packet may store a plurality of node IDs and the respective monitor data corresponding to the plurality of node IDs. For example, the monitor packet may store the information for identifying the worst node and the second worst node, and the monitor data detected in the respective nodes. In this case, the monitor server 12 may specify a plurality of nodes in a poor state or performance in the route of one monitor packet. Therefore, when the multi-hop wireless network has a large number of nodes, this method is adopted to improve the efficiency of the monitoring operation.

The monitor method according to the present embodiment may monitor a plurality of items concurrently with one monitor packet. For example, the monitor method according to the present embodiment may concurrently monitor two or more items in the reception power, the packet error rate, the transmission queue length, and the wireless band use rate (that is, the busy time). In this case, the monitor packet has formats of storing the worst node IDs and the worse node data for the plurality of items.

In the embodiment above, the state of the multi-hop wireless network is monitored using the monitor packet for transmitting monitor data, but the present invention is not limited to this method. That is, the monitor server 12 may monitor the state of the multi-hop wireless network using a packet for other objectives. For example, the node equipment may store monitor data in the data packet which stores sensor data collected by a data collection device. In this case, the node equipment which forwards the data packet updates the monitor data as necessary.

Furthermore, the monitor server 12 may monitor the state of the multi-hop wireless network using a Hello packet. The Hello packet is used for notification of the existence of a node to an adjacent node, and is periodically transmitted from each node equipment.

FIG. 13 illustrates an example of a Hello packet. The Hello packet is broadcasted to an adjacent node. Therefore, a broadcast address is set for the local destination. If monitor data is transmitted using the Hello packet, the Hello packet includes a monitor data flag, a worst node ID, and worst node data as with the monitor packet illustrated in FIG. 7. The Hello packet may further include the information for generation of the link table 5 and the routing table 6 by node equipment.

FIGS. 14A through 14C are explanatory views of the method of transmitting monitor data using a Hello packet. In this example, it is assumed that each node equipment detects a packet error rate as monitor data. The detected packet error rates of node equipments J, I, H, B and GW are 0.1, 0.2, 0.3, 0.2 and 0.1, respectively. Each node equipment periodically broadcasts a Hello packet including monitor data.

In FIG. 14A, the node equipments I and GW respectively transmit a Hello packet. The Hello packet i transmitted from the node equipment I stores the "worst node ID=I" and the "worst node data=0.2". The Hello packet i is received by the node equipments J and H. The description of the Hello packet transmitted from the node equipment GW is omitted here.

The node equipment J compares the worst node data stored in the Hello packet i with the packet error rate of the node J. In this example, the worst node data is worse than the packet error rate of the node J. Therefore, in this case, the node equipment J holds the "worst node ID=I" and the "worst node data=0.2" notified by the Hello packet i.

Similarly, the node equipment H compares the worst node data stored in the received Hello packet i with the packet error rate of the node H. In this example, the worst node data is better than the packet error rate of the node H. Therefore, in this case, the node equipment H does not hold the "worst node ID=I" or the "worst node data=0.2" notified by the Hello packet i.

In FIG. 14B, the node equipment H transmits a Hello packet. The Hello packet h transmitted from the node equipment H stores the "worst node ID=H" and the "worst node data=0.3". In this example, the Hello packet h is received by the node equipments I and B.

The operation of the node equipments I and B that receive the Hello packet h is substantially the same as the operation of the node equipment J illustrated in FIG. 14A. Therefore, for example, the node equipment B compares the worst node data stored in the Hello packet h with the packet error rate of the node B. In this example, the worst node data is worse than the packet error rate of the node B. Therefore, in this case, the node equipment B holds the "worst node ID=H" and the "worst node data=0.3" notified by the Hello packet h.

In FIG. 14C, the node equipments B and J respectively transmit a Hello packet. Described below is the Hello packet b transmitted from the node equipment B.

The node equipment B recognizes by the Hello packet h received from the node H that there is a node having a worse packet error rate than the node B. That is, the node equipment B recognizes the "worst node ID=H" and the "worst node data=0.3". Therefore, in this case, the node equipment B generates and transmits a Hello packet b including the "worst node ID=H" and the "worst node data=0.3".

The Hello packet b is received by the node equipments GW and H. As a result, the node equipment GW can detect the "worst node ID=H" and the "worst node data=0.3". Therefore, the monitor server 12 can specify the worst node in the nodes J, I, H, and B.

However, a certain time is required to propagate a Hello packet in the entire multi-hop wireless network. Especially, in a multi-hop wireless network including a large number of nodes, a long time may be taken to allow the worst monitor data to reach the node GW. Therefore, in the method in which monitor data is transmitted using a Hello packet, the monitor server 12 may specify the worst node, for example, when a specified time determined depending on the number of nodes in a multi-hop wireless network passes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A multi-hop wireless network monitor method for monitoring a state of a multi-hop wireless network including a plurality of nodes, the method comprising:
transmitting a packet that stores monitor data indicating a state or performance of a first node and identification information that identifies the first node;
rewriting the monitor data stored in the packet with the monitor data detected by a second node and rewriting the identification information stored in the packet with the identification information that identifies the second node in the second node when the monitor data detected by the second node is worse than the monitor data stored in the packet; and
specifying a node in the worst state or performance in a propagation route of the packet according to the identification information stored in the packet, wherein
when the monitor data detected by the second node is better than the monitor data stored in the packet, the monitor data stored in the packet is not rewritten and the identification information stored in the packet is not rewritten, and wherein
the identification information stored in the packet identifies only one node in which the worst state or performance in a propagation route of the packet is detected.

2. The method according to claim 1, wherein
node equipment located in an uppermost stream in the multi-hop wireless network with respect to a monitor equipment connected to the multi-hop wireless network transmits the packet to the monitor equipment; and
the monitor equipment specifies a node in the worst state or performance in a propagation route of the packet according to the identification information stored in the packet.

3. The method according to claim 1, wherein
the monitor data and the identification information are stored in a packet which is periodically transmitted from each node equipment for notification of an existence of a node to an adjacent node.

4. The method according to claim 1, wherein
the monitor data indicates reception power in a node equipment.

5. The method according to claim 4, wherein
the monitor data indicates a change of the reception power with respect to time.

6. The method according to claim 1, wherein
the monitor data indicates a packet error rate in a node equipment.

7. The method according to claim 1, wherein
the monitor data indicates a transmission queue length in a node equipment.

8. The method according to claim 1, wherein
the monitor data indicates a wireless band use rate of a node equipment.

9. A multi-hop wireless network system including a plurality of node equipments, wherein
the node equipment comprises:
- a monitor data acquisition unit configured to acquire monitor data that indicates a state or performance of the node equipment;
- a monitor data comparison unit configured to compare first monitor data stored in a received monitor packet with second monitor data acquired by the acquisition unit, the monitor packet storing monitor data that indicates a state or performance of a node and identification information that identifies the node;
- a monitor packet processing unit configured to rewrite the monitor data stored in the monitor packet from the first monitor data to the second monitor data and rewrite the identification information stored in the monitor packet with identification information that identifies the local node, when the second monitor data is worse than the first monitor data; and
- a transmission unit configured to transmit the monitor packet processed by the monitor packet processing unit, wherein when the second monitor data is better than the first monitor data, the monitor packet processing unit does not rewrite the monitor data stored in the monitor packet and does not rewrite the identification information stored in the monitor packet, the identification information stored in the monitor packet identifies only one node in which the worst state or performance in a propagation route of the monitor packet is detected, the monitor packet is forwarded to a monitor equipment which specifies a node in the worst state or performance in a propagation route of the monitor packet through one or more node equipments.

10. Node equipment that is used in a multi-hop wireless network, the node equipment comprising:
- a monitor data acquisition unit configured to acquire monitor data that indicates a state or performance of the node equipment;
- a monitor data comparison unit configured to compare first monitor data stored in a received monitor packet with second monitor data acquired by the acquisition unit, the monitor packet storing monitor data that indicates a state or performance of a node and identification information that identifies the node;
- a monitor packet processing unit configured to rewrite the monitor data stored in the monitor packet from the first monitor data to the second monitor data and rewrite the identification information stored in the monitor packet with identification information that identifies the local node, when the second monitor data is worse than the first monitor data; and
- a transmission unit configured to transmit the monitor packet processed by the monitor packet processing unit, wherein when the second monitor data is better than the first monitor data, the monitor packet processing unit does not rewrite the monitor data stored in the monitor packet and does not rewrite the identification information stored in the monitor packet, and wherein the identification information stored in the monitor packet identifies only one node in which the worst state or performance in a propagation route of the monitor packet is detected.

* * * * *